United States Patent [19]

Moriki

[11] 3,794,760

[45] Feb. 26, 1974

[54] HORIZONTAL SYNCHRONIZING DEVICE FOR TELEVISION RECEIVERS

[75] Inventor: Juichi Moriki, Nishinomiya, Japan

[73] Assignee: Matsushita Electric Industrial Co., Ltd., Osaka, Japan

[22] Filed: Sept. 7, 1971

[21] Appl. No.: 177,967

[52] U.S. Cl. ......... 178/69.5 N, 331/116 R, 331/172

[51] Int. Cl. ............................................ H04n 5/04

[58] Field of Search ..... 331/73, 116 R, 116 M, 139, 331/154, 155, 158, 172; 178/69.5 TV

[56] References Cited

UNITED STATES PATENTS

| | | | |
|---|---|---|---|
| 2,753,527 | 7/1956 | Adler | 331/172 |
| 2,684,404 | 7/1954 | Adler | 331/172 |
| 3,546,630 | 12/1970 | Jordan | 331/172 |
| 3,408,515 | 10/1968 | Morse | 310/9.5 |
| 3,433,982 | 3/1969 | Kaname et al. | 310/9.8 |
| 2,472,691 | 6/1949 | Bond | 310/9.5 |
| 3,150,275 | 9/1964 | Lucy | 310/9.8 |
| 3,421,109 | 1/1969 | Wiggins et al. | 310/9.8 |
| 3,629,625 | 12/1971 | Schafft | 310/9.8 |

*Primary Examiner*—Robert L. Griffin
*Assistant Examiner*—George G. Stellar
*Attorney, Agent, or Firm*—Stevens, Davis, Miller & Mosher

[57] ABSTRACT

A horizontal synchronizing device for television receivers, wherein a horizontal synchronizing signal is imparted to an oscillator which is frequency-controlled by means of a mechanical resonator, and the oscillation frequency and phase of the oscillator are synchronized with those of said horizontal synchronizing signal by utilizing the drawing effect of said oscillator.

12 Claims, 18 Drawing Figures

HORIZONTAL SYNCHRONIZING DEVICE FOR TELEVISION RECEIVERS

This invention relates to a novel horizontal synchronizing device for television receivers.

In television receivers, it is required that the frequency and phase of oscillation produced by the horizontal oscillator be completely synchronized with those of the horizontal synchronizing signal transmitted from a broadcast station. To meet this requirement, the conventional television receivers use an AFC circuit (automatic frequency control circuit). Pulse-width AFC circuits, saw-tooth wave AFC circuits or the like have most commonly been used.

Referring to FIG. 1, there is shown an example of a saw-tooth wave type AFC circuit incorporated in the conventional transistorized television receiver. The operation of such an AFC will now be described with reference to FIG. 1, wherein numeral 1 represents a blocking oscillator which produces a rectangular wave, and 2 an amplifier for such a rectangular wave, the output of which drives a horizontal output transistor. Part of the output available from the amplifier is fed back to a phase discriminator circuit 4 through an integrator circuit 3. Numeral 5 denotes a synchronizing signal amplifier in which a synchronizing signal available from a sync separator is amplified and then transmitted to the phase discriminator circuit. In this phase discriminator, discrimination between the frequency and phase of the feedback signal and those of the synchronizing signal is effected, and if those frequencies and phases are different, the output voltage of the discriminator is changed in such a direction as to make the oscillation frequency of the oscillator conform to that of the synchronizing signal. In this case, in order to improve the noise characteristics, the aforementioned voltage is passed through the integrator circuit 6 so as to be applied to the oscillator 1 as a bias voltage. In this way, the frequency and phase of the oscillation produced by the oscillator are synchronized with those of the synchronizing signal.

A primary object of this invention is to achieve such a synchronizing function, reduce the manufacturing cost, improve the characteristics, and provide many other advantages.

Other objects, features and advantages of the present invention will become apparent from the following description taken in conjunction with the accompanying drawings, in which.

Figure 2:
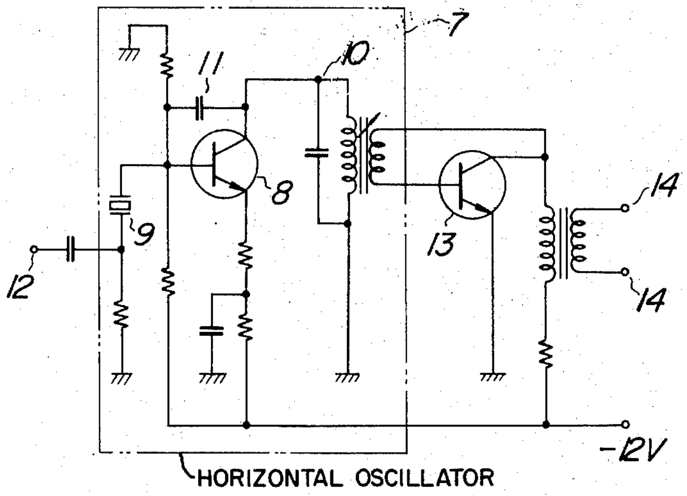
FIG. 2 is a circuit diagram showing a first embodiment of this invention.
Figure 4:
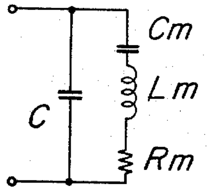
FIG. 4 is an electrical equivalent circuit diagram of a mechanical resonator used in this invention.
Figure 5:
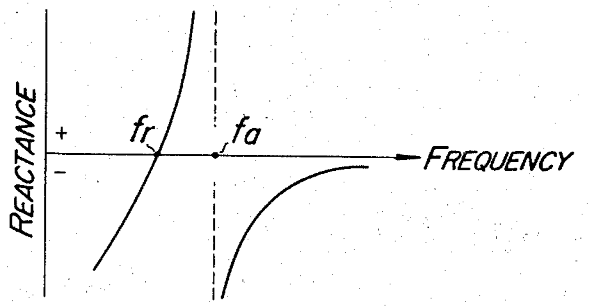
FIG. 5 shows the frequency response of the reactance component of the mechanical resonator shown in FIG. 4.
Figure 6:
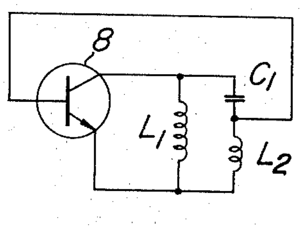
FIG. 6 is an alternate current equivalent circuit diagram of the oscillator contained in the circuit of FIG. 2.

Referring to FIG. 2 of the drawings, numeral 7 represents a horizontal oscillating circuit comprising an oscillating transistor 8, a frequency control mechanical resonator (crystal resonator or piezoelectric ceramic resonator, for example) 9, a tank circuit 10, a feedback capacitor 11 and so forth. An equivalent circuit of the aforementioned mechanical resonator is as shown in FIG. 4, wherein C is the capacitance between the electrodes, and $C_m$, $L_m$ and $R_m$ are the equivalent resonance capacitance, inductance and resistance of the mechanical system of the resonator respectively. Referring to FIG. 5, there is shown the relationship between the frequency and the imaginary part or reactance part of the impedance function of the two-terminal circuit shown in FIG. 4, from which it will be seen that the reactance is positive or inductive in the narrow frequency range between the series resonance frequency $f_r$ defined by $C_m$ and $L_m$ and the parallel resonance frequency $f_a$ defined by $L_m$ and C but it becomes negative at frequencies outside such a narrow frequency range. The principal equivalent circuit of the oscillator 7 shown in FIG. 2 is as shown in FIG. 6 wherein $L_1$ is the reactance of the tank circuit 10, the resonance frequency of the tank circuit being selected to be higher than the oscillation frequency of this oscillator so that the reactance of the tank circuit 10 becomes inductive, $C_1$ is the capacitance of the capacitor 11, and $L_2$ is the reactance of the mechanical resonator, the resonance frequency of the mechanical resonator being so set up that the reactance $L_2$ becomes inductive, that is, the oscillation frequency occurs between $f_r$ and $f_a$. With such an arrangement, a signal amplified in the transistor 8 will be divided by $C_1$ and $L_2$ and then fed back to the base of the transistor 8 so that there will be produced a sinusoidal oscillation at a frequency between $f_r$ and $f_a$, as will be seen from FIG. 4.

In the aforementioned type of oscillator, the oscillation frequency can be sharply and accurately controlled, since the oscillation frequency occurs between $f_r$ and $f_a$ and in this frequency range the reactance component $L_2$ of the mechanical resonator 9 changes with frequency very sharply as shown in FIG. 5 so that for example, if the oscillation frequency is increased even slightly $L_2$ is sharply increased with the result that the oscillation frequency is lowered so that the original condition may be regained while if the oscillation frequency is decreased even slightly, $L_2$ is sharply decreased with the result that the oscillation frequency is increased so that in this case, too, the original condition may be regained. In this way, a very sharp and accurate frequency controlling effect can be produced. Furthermore, the mechanical resonator of the aforementioned type has very good temperature stability and ageing stability. Hence, with the aforementioned oscillator, the oscillation frequency can be produced in exact agreement with the horizontal synchronizing signal, and besides, a very high stability can be achieved because it is less influenced by ageing, temperature variations and so forth.

Figures 3A, 3B, 3C, 3D:
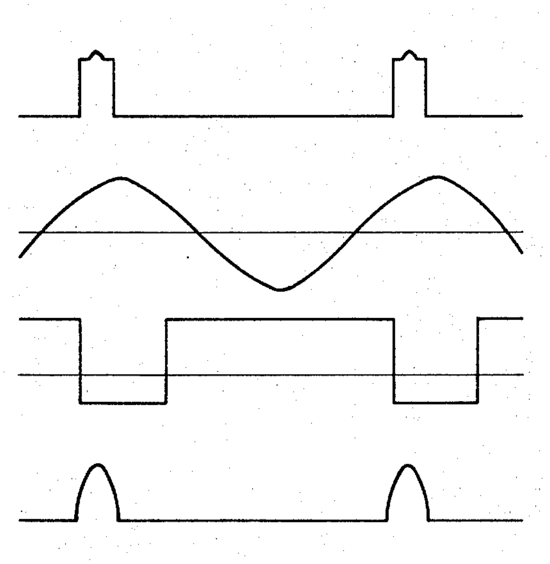
FIGS. 3A-3D are waveform diagrams useful for explaining the circuit shown in FIG. 2.

With the oscillator of which the oscillation frequency is very close to the frequency of the horizontal synchronizing signal, if the horizontal synchronizing signal is imparted thereto at input terminal 12 thereof, then the oscillation frequency tends to be drawn toward the frequency of the synchronizing signal so as to be in perfect agreement therewith. Meanwhile, the phase of the oscillation can be maintained at one which depends upon the then circuit conditions. Assume that for example, such a horizontal synchronizing signal as shown in FIG. 3(A) is imparted to the input terminal 12. Then, such voltage as shown in FIG. 3(B) will appear across the tank circuit 10. By taking this voltage out of the secondary side and exciting the transistor 13 in high amplitude with it, it is possible to obtain a rectangular wave as shown in FIG. 3(C) across output terminals 14. Furthermore, by exciting a horizontal output transistor with the rectangular wave thus obtained, it is possible to obtain fly back pulse train which is completely in agreement with the horizontal synchronizing signal with respect to frequency and phase, as shown in FIG. 30.

Figure 8:
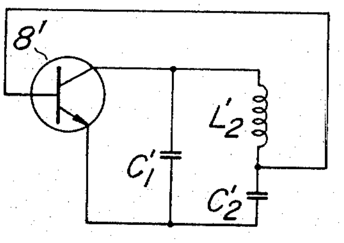
FIG. 8 is an alternate current equivalent circuit diagram of the oscillator included in the circuit of FIG. 7.
Figure 7:
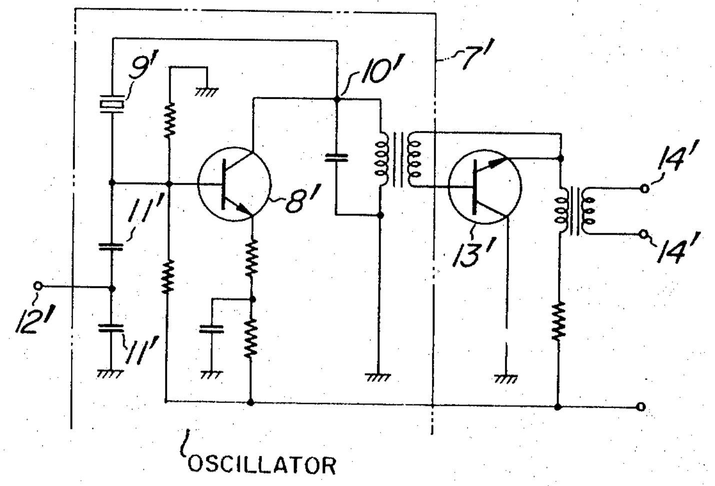
FIG. 7 is a circuit diagram showing a second embodiment of this invention.

Referring now to FIG. 7, there is shown an arrangement according to a second embodiment of this invention, wherein 7' represents an oscillator which comprises an oscillating transistor 8', frequency controlling mechanical resonator 9', tank circuit 10' and feedback capacitors 11'. The principal equivalent circuit of the oscillator 7' shown in FIG. 7 is as shown in FIG. 8, wherein $C'_1$ is the reactance of the tank circuit 10', the resonance frequency of which being so selected as to be lower than the oscillation frequency of the oscillator so that the reactance $C'_1$ becomes capacitive, $L'_2$ is the reactance of the mechanical resonator 9', the resonance frequency of which being so selected that the reactance $L'_2$ becomes inductive, that is, the oscillation frequency occurs between $f_r$ and $f_a$, and $C'_2$ is the capacitance of the capacitor 11'. With such an arrangement, a signal amplified in the transistor 8' will be divided by $L'_2$ and $C'_2$ and then fed back to the base of the transistor 8' so that there is produced a sinusoidal oscillation at a frequency between $f_r$ and $f_a$, as will be seen from FIG. 8. In this oscillator, too, the oscillation frequency can be very sharply and accurately controlled as in the oscillator 7 of FIG. 2.

Thus, imparting a horizontal synchronizing signal to the oscillator 7' at the input terminal 12' with the oscillation frequency thereof selected in exact agreement with the frequency of the synchronizing signal will result in the oscillation frequency being drawn toward the frequency of the synchronizing signal so as to be in exact agreement therewith. In this case, the phase of the oscillation can be maintained at one which depends upon the then circuit conditions.

Figure 9:
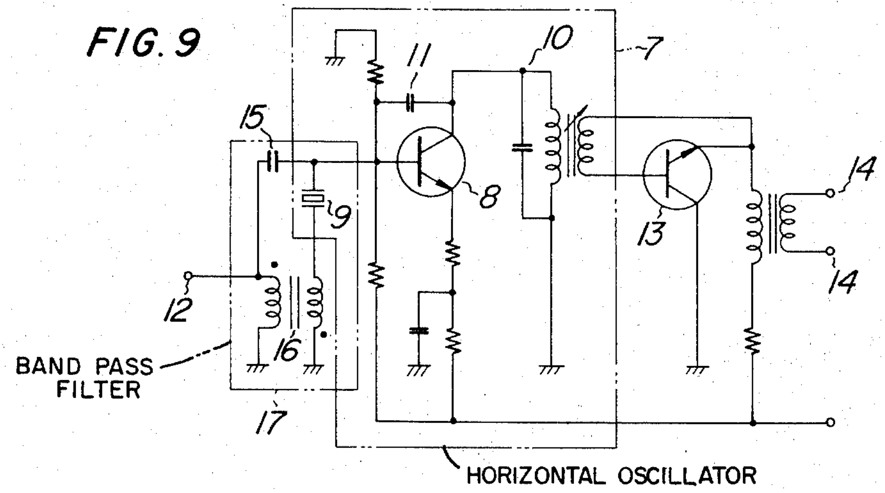
FIG. 9 is a circuit diagram showing a third embodiment of this invention.

FIG. 9 shows the arrangement according to a third embodiment of this invention which is a modification of that shown in FIG. 2. It will be appreciated that the arrangement of FIG. 9 is different from that of FIG. 2 only in that a band pass filter 17 is constituted by a capacitor 15, transformer 16 and mechanical resonator 9.

Figure 10:
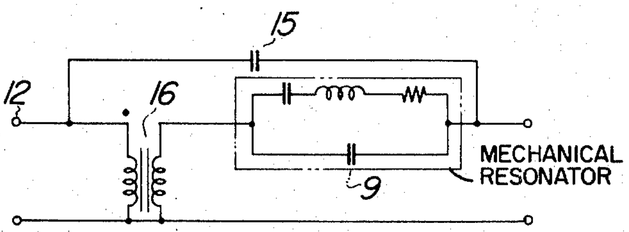
FIG. 10 is an equivalent circuit diagram showing the band pass filter adapted for use with the circuit of FIG. 9.

An equivalent circuit of the band pass filter 17 is shown in FIG. 10, which is equivalent to a typical lattice-type band pass filter. Since the horizontal synchronizing signal coming in from the input terminal 12 is imparted to the horizontal oscillator 7 through this band pass filter, even if heavy great noise comes in together with the horizontal synchronizing signal, noise outside the pass band of the filter will be eliminated so that synchronization will never be disturbed by such noise. It is also possible to prevent interruption of the oscillation due to suppression of the oscillator 7 by noise. In this way, the mechanical resonator 9 serves not only as oscillation frequency control for the oscillator 7 but also as reactance of the noise eliminating band pass filter provided at the stage preceding the oscillator. Thus, effective utilization of the high Q of the mechanical resonator makes it possible to constitute a band pass filter with very sharp frequency selectivity characteristics.

Figure 11:
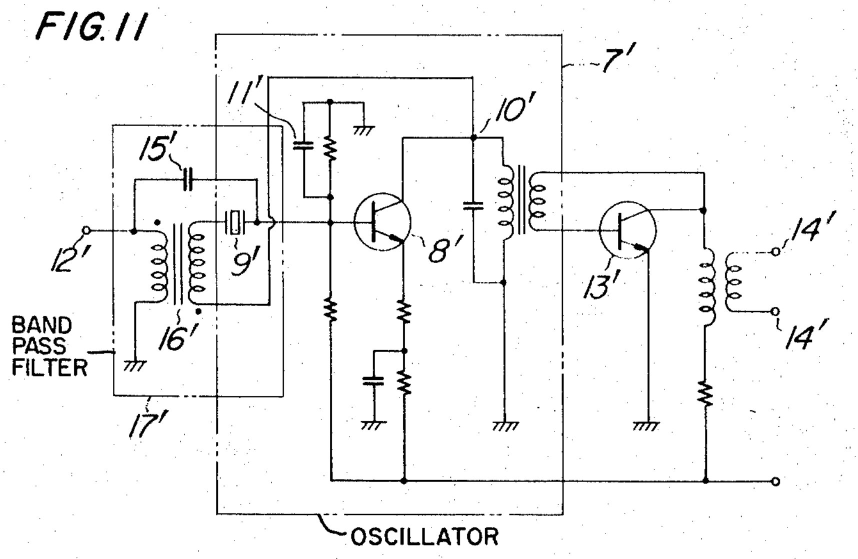
FIG. 11 is a circuit diagram showing a fourth embodiment of this invention.

FIG. 11 shows the arrangement according to a fourth embodiment of this invention, which is a modification to that of FIG. 7. The difference between the arrangement of FIG. 11 and that of FIG. 7 is that in FIG. 11 the horizontal synchronizing signal is imparted to the oscillator 7' through a band pass filter 17' constituted by a capacitor 15', transformer 16' and mechanical resonator 9'.

Description will now be made of examples of the mechanical resonator.

Figure 12:
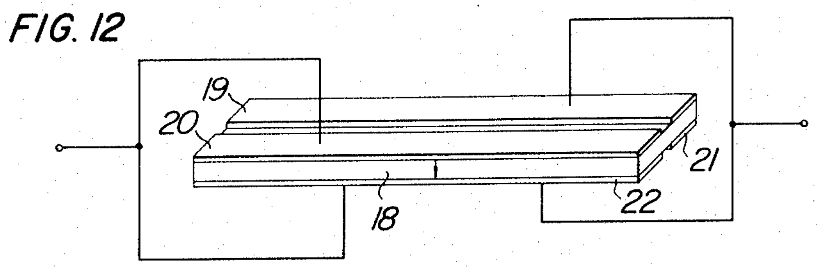
FIG. 12 is a perspective view showing a first example of the mechanical resonator for use with this invention.
Figure 13:
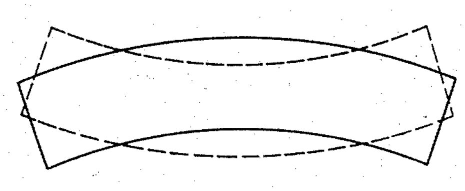
FIG. 13 is a view useful for explaining the oscillation mode of the mechanical resonator shown in FIG. 12.

FIG. 12 is a perspective view of a first example of mechanical resonator, wherein 18 represents the main body of the resonator formed by a piezoelectric ceramic material such as PZT ceramic, PCM ceramic or the like and which is polarized in the direction of thickness thereof (in such a direction as shown by an arrow mark). The resonator body has electrodes attached to its top and bottom surfaces, each of these electrodes being divided at the center into two portions as shown at 19, 20 and 21, 22, and connection is made to the electrodes in such a manner that voltages of reverse polarities are applied between a pair of opposing electrodes 19 and 21 and between another pair of opposing electrodes 20 and 22. With such an arrangement, when one of the halves is expanded, the other half is contracted, so that there occurs a bending vibration, as shown in FIG. 13. A bending type resonator of a piezoelectric material can be miniaturized into a dimension as small as 30 mm in length, 4 mm in width and one mm in thickness despite the fact that it is required that the resonance frequency be as low as 15.75 KHz, and yet it can be produced with ease and at a low cost.

Figure 14:
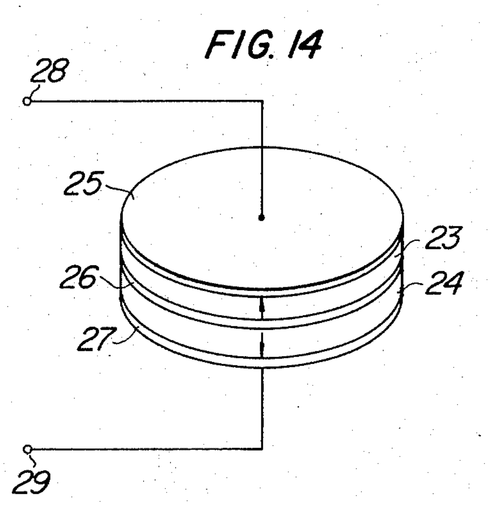
FIG. 14 is a perspective view showing a second example of the mechanical resonator for use with this invention.
Figure 15:
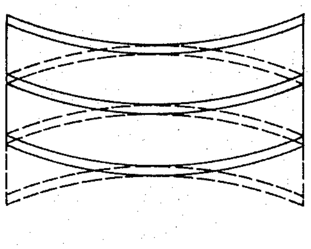
FIG. 15 is a view useful for explaining the oscillation mode thereof.

FIG. 14 is a perspective view showing a second example of the mechanical resonator, wherein numerals 23 and 24 represent piezoelectric ceramic bodies having electrodes 25, 26 and 27 attached to the opposing surfaces thereof and which are polarized in opposite directions as shown by arrows. Application of an A.C. voltage between the terminals 28 and 29 of the resonator will result in the bodies 23 and 24 being diametrically expanded and contracted. In this case, when the body 23 expands, the body 24 contracts and vice versa. Thus the resonator effects a flexing motion. Such a resonator can be miniaturized into a dimension as small as 15 mm in diameter and 2 mm in thickness despite the fact that it is required that the resonance frequency be as low as 15.75 KHz, and yet it can be produced with ease and at a low cost.

The advantages of this invention will now be described.

Figure 1:
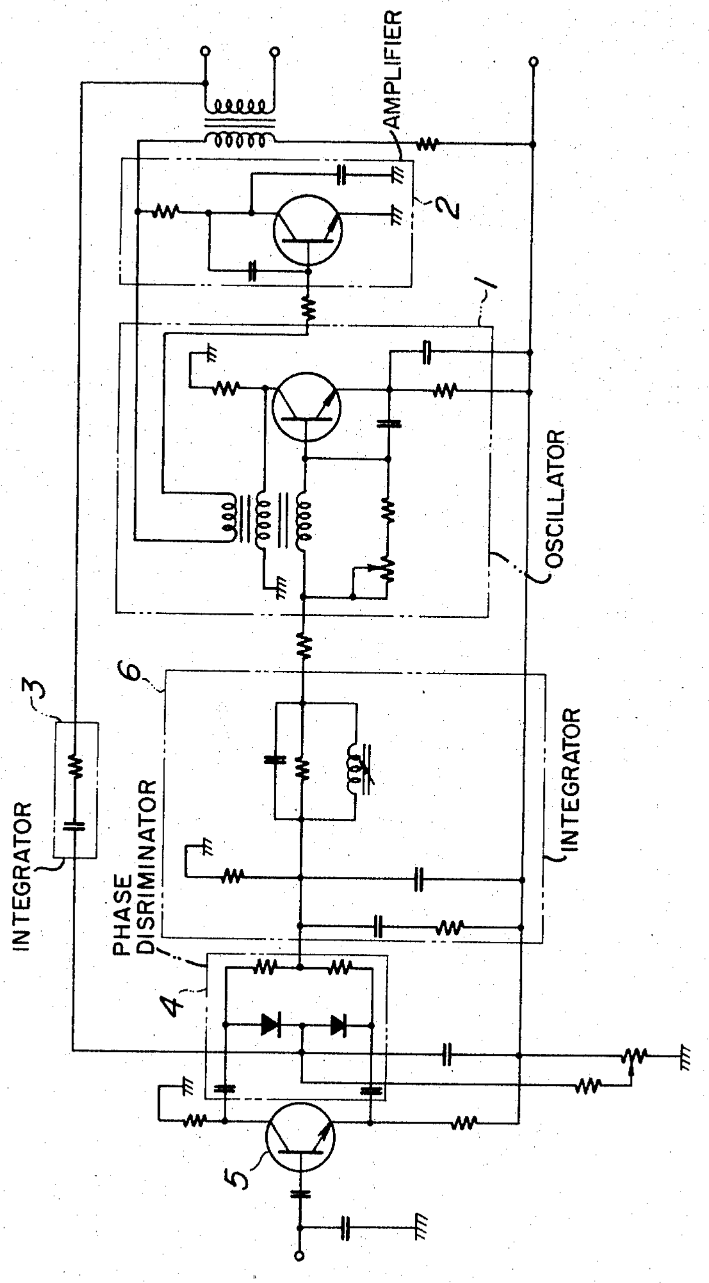
FIG. 1 PRIOR ART
FIG. 1 is a circuit diagram showing the horizontal synchronizing circuit incorporated in a conventional television receiver.

A first advantage of this invention is that the circuit arrangement of this invention is simplified so that the circuit can be miniaturized and produced at a low cost. More specifically, the horizontal amplifier circuit shown in FIG. 1 can be eliminated, and in addition, the phase discriminator circuit 4, integrator circuit 6 and feedback circuit 3 can also be eliminated. By virtue of the fact that the mechanical resonator is made of a piezoelectric ceramic material (for example, PZT ceramic or PCM ceramic) which has recently been developed and either surface bending vibration mode or simple harmonic motion mode is employed, the resonator can be greatly miniaturized and produced with ease and at a low cost despite the fact the resonance frequency is as low as 15.75 KHz. Thus, in accordance with this invention, the horizontal oscillator and sync circuits for a television receiver can be greatly simplified, miniaturized and produced at a very low cost.

A second advantage of this invention is that highly improved noise characteristics can be achieved. In the case of the conventional oscillator circuit 1 shown in FIG. 1, difficulty is encountered in an attempt to stabilize the oscillation frequency because the circuit constitutes a saw-tooth wave oscillator wherein the oscillator frequency depends directly upon the temperature characteristics or ageing of the transistor used therein. With regard to the temperature characteristics, for example, the oscillation frequency varies more than ± 11 percent in the temperature range of 20° to 60°C. Generally, with the prior art arrangement, since the oscillation frequency is spaced widely apart from the frequency of the synchronizing signal, incoming noise makes the flyback pulses out of phase, thus causing picture disturbance. In contrast, with the circuit embodying the present invention, since the mechanical resonator described above is incorporated therein, the oscillation frequency is very accurate and stable, its deviation from the horizontal sync frequency being less than 0.1 percent. Despite disturbance by contemporary noise, the phase of the oscillation remains substantially nonshifted. Thus, the circuit according to this invention is very stable with respect to noise. Especially, the circuit arrangement shown in FIGS. 9 and 11 have further improved noise characteristics for synchronization, since the horizontal synchronizing signal is imparted to the oscillator circuit through a band pass filter with very sharp frequency selectivity characteristics which is constituted by a mechanical resonator having very sharp frequency selectivity characteristics, a capacitor and transformer. For the reasons described above, highly improved noise characteristics can be achieved.

A third advantage of this invention is that the use of the circuit embodying this invention in a television receiver eliminates any horizontal sync knob. In other words, the use of the circuit according to this invention makes it possible to construct a television set wherein horizontal synchronization will never fail. Obviously, this constitutes a great advantage.

A fourth advantage of this invention is that the load on the horizontal output transistor can be decreased. In the case of the oscillator circuit in FIG. 1, a wide range over which the oscillation frequency can be changed should be secured since the oscillation frequency is very unstable and moreover there tends to occur wide frequency fluctuations. Normally, it is essential that such a frequency range be about ± 10 percent with respect to the horizontal sync frequency. In such a case, however, if the frequency is lowered by about 10 percent, then the current flowing through the transistor will increase by about 10 percent, and the voltage applied thereto will also build up by 10 percent. Therefore, allowances of about 10 percent in the current capacity and breakdown voltage must be secured with respect to the transistor. In contrast, the circuit of this invention requires no such allowances since frequency variation as described above does not occur, so that the load on the transistor can be reduced.

A fifth advantage of the present invention is that any disagreement in phase between the horizontal synchronizing signal and the flyback pulse can be eliminated because of the high stability of the oscillation frequency. With the conventional circuit shown in FIG. 1, the oscillation frequency can be varied because of the fact that the oscillation frequency is unstable and tends to be subject to large fluctuations. Thus, if the free oscillation frequency of the oscillator is deviated from the frequency of the horizontal synchronizing signal due to temperature variation or ageing or by turning the oscillation frequency adjustment knob (horizontal sync knob), then a phase shift will occur between the horizontal synchronizing signal and the flyback pulse. In the case of a black-and-white television receiver, it merely happens that the picture moves to the left or to the right, whereas in the case of a color television receiver, the fact that the burst amplifier is gated with the flyback pulse makes it impossible to take out the burst signal, so that color synchronization will never be destroyed. For this reason, a color television receiver uses a complicated feedback circuit constituted by a diode and as many as ten capacitors and resistors. In the circuit of this invention, however, no such care is required because the oscillation frequency is highly stable and no oscillation frequency adjustment knob is present. As will be appreciated from what has been described above, the present invention has a great many advantages and high industrial value.

What is claimed is:

1. In a television horizontal sync system comprising an input terminal for receiving a horizontal synchronizing signal, and an oscillator circuit coupled to said input terminal, said oscillator circuit having a mechanical resonator for determining the frequency of oscillation of said oscillator circuit, wherein the improvement comprises a mechanical resonator formed of a piezoelectric ceramic material polarized in the direction of thickness thereof and having top and bottom electrodes attached to top and bottom surfaces perpendicular to the direction of said polarization respectively, said top electrode being longitudinally divided into a first top electrode and a second top electrode and said bottom electrode being longitudinally divided into a first bottom electrode and a second bottom electrode, said first bottom electrode facing said first top electrode and said second bottom electrode facing said second top electrode, said first top electrode being connected to said second bottom electrode so as to constitute a first terminal while said second top electrode is connected to said first bottom electrode so as to constitute a second terminal so that said resonator is made to effect bending vibration in the direction of the surfaces thereof, the oscillation frequency and phase of said oscillator circuit being brought into synchronism with the frequency and phase of said horizontal synchronizing signal, and a filter circuit coupled between said input terminal and said oscillator circuit, said piezoelectric ceramic resonator comprising an element of said filter circuit in addition to determining the frequency of oscillation of said oscillator circuit.

2. In a television horizontal sync system comprising an input terminal for receiving a horizontal synchronizing signal and an oscillator circuit coupled to said input terminal, said oscillator circuit having a mechanical resonator for determining the frequency of oscillation of said oscillator circuit, wherein the improvement comprises a mechanical resonator comprising a pair of laminated resonator elements formed of a piezoelectric ceramic material, each resonator element being oppositely polarized in the direction of thickness thereof, and having top and bottom electrodes attached to the surfaces perpendicular to the direction of said polarization so that said pair of resonator elements effects a flexing motion, the oscillation frequency and phase of said oscillator circuit being brought into synchronism with the frequency and phase of said horizontal synchronizing signal, and a filter circuit coupled between said input terminal and said oscillator circuit, said piezoelectric ceramic resonator comprising an element of said filter circuit in addition to determining the frequency of oscillation of said oscillator circuit.

3. A television horizontal sync system for providing an output voltage in synchronism with the frequency and phase of a horizontal synchronizing signal comprising;

a. an input terminal for receiving said horizontal synchronizing signal;

b. an oscillating transistor coupled to said input terminal, said transistor having emitter, base and collector electrodes;

c. a tank circuit coupled between the emitter and collector electrodes of said transistor;

d. a feed back capacitor and a mechanical resonator connected in series between the emitter and collector electrodes of said transistor, the junction of said feed back capacitor and mechanical resonator being coupled to the base of said transistor, said mechanical resonator comprising a piezoelectric ceramic material polarized in the direction of thickness thereof and having top and bottom electrodes attached to top and bottom surfaces perpendicular to the direction of said polarization respectively, said top electrode being longitudinally divided into a first top electrode and a second top electrode and said bottom electrode being longitudinally divided into a first bottom electrode and a second bottom electrode, said first bottom electrode facing said first top electrode and said second bottom electrode facing said second top electrode, said first top electrode being connected to said second bottom electrode so as to constitute a first terminal and said second top electrode being connected to said first bottom electrode so as to constitute a second terminal, said resonator effecting bending vibration in the direction of the surfaces thereof; and e. output means coupled to said tank circuit for producing said output voltage in synchronism with the horizontal synchronizing signal applied to said input terminal.

4. A television horizontal sync system as defined by claim 3 wherein said feed back capacitor is coupled between the base and collector electrodes of said transistor and the first and second terminals of said mechanical resonator are coupled to the base and emitter electrode of said transistor respectively.

5. A television horizontal sync system as defined by claim 4 which further comprises a transformer having a primary winding coupled between said input terminal and the emitter of said transistor and a secondary winding coupled between the second terminal of said mechanical resonator and the emitter of said transistor, and a filter capacitor coupled between said input terminal and the base of said transistor, said mechanical resonator determining the frequency of oscillation of said sync system and comprising an element of a filter circuit including said transformer and said filter capacitor.

6. A television horizontal sync system as defined by claim 3 wherein said feedback capacitor is coupled between the base and emitter electrodes of said transistor and the first and second terminals of said mechanical resonator are coupled to the base and collector electrodes of said transistor respectively.

7. A television horizontal sync system as defined by claim 6 which further comprises a transformer having a primary winding coupled between said input terminal and the emitter of said transistor and a secondary winding coupled between the second terminal of said mechanical resonator and the collector of said transistor, and a filter capacitor coupled between said input terminal and the base of said transistor, said mechanical resonator determining the frequency of oscillation of said sync system and comprising an element of a filter circuit including said transformer and said filter capacitor.

8. A television horizontal sync system for providing an output voltage in synchronism with the frequency and phase of a horizontal synchronizing signal comprising;

a. an input terminal for receiving said horizontal synchronizing signal;

b. an oscillating transistor coupled to said input terminal, said transistor having emitter, base and collector electrodes;

c. a tank circuit coupled between the emitter and collector electrodes of said transistor;

d. a feed back capacitor and a mechanical resonator connected in series between the emitter and collector electrodes of said transistor, the junction of said feed back capacitor and mechanical resonator being coupled to the base of said transistor, said mechanical resonator comprising a pair of laminated resonator elements formed of a piezoelectric ceramic material, each resonator element being oppositely polarized in the direction of thickness thereof, and having top and bottom electrodes attached to the surfaces perpendicular to the direction of said polarization so that said pair of resonator elements effects a flexing motion; and e. output means coupled to said tank circuit for producing said output voltage in synchronism with the horizontal synchronizing signal applied to said input terminal.

9. A television horizontal sync system as defined by claim 8 wherein said feed back capacitor is coupled between the base and collector electrodes of said transistor and the top and bottom electrodes of said mechanical resonator are coupled to the base and emitter electrode of said transistor respectively.

10. A television horizontal sync system as defined by claim 9 which further comprises a transformer having a primary winding coupled between said input terminal and the emitter of said transistor and a secondary winding coupled between the bottom electrode of said mechanical resonator and the emitter of said transistor, and a filter capacitor coupled between said input terminal and the base of said transistor, said mechanical resonator determining the frequency of oscillation of said sync system and comprising an element of a filter circuit including said transformer and said filter capacitor.

11. A television horizontal sync system as defined by claim 8 wherein said feedback capacitor is coupled between the base and emitter electrodes of said transistor and the top and bottom electrodes of said mechanical resonator are coupled to the base and collector electrodes of said transistor respectively.

12. A television horizontal sync system as defined by claim 11 which further comprises a transformer having a primary winding coupled between said input terminal and the emitter of said transistor and a secondary winding coupled between the bottom electrode of said mechanical resonator and the collector of said transistor, and a filter capacitor coupled between said input terminal and the base of said transistor, said mechanical resonator determining the frequency of oscillation of said sync system and comprising an element of a filter circuit including said transformer and said filter capacitor.

* * * * *